March 4, 1947.　　　J. U. GARIBAY　　　2,416,872
WELDING TOOL
Filed Oct. 25, 1943
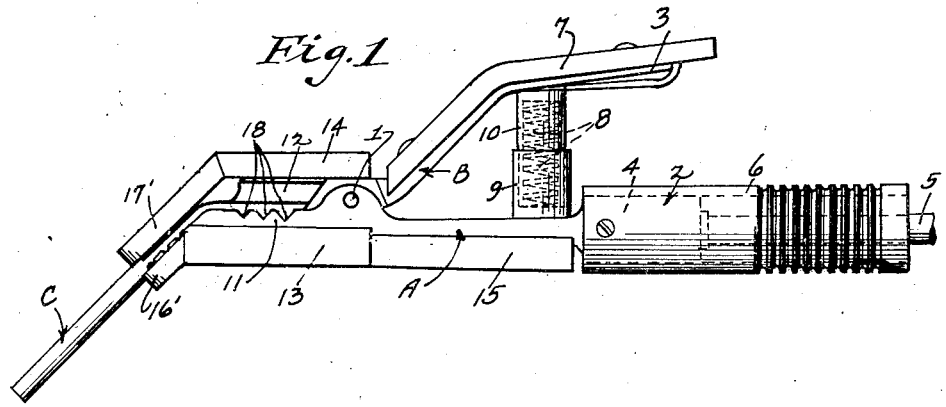
Fig. 1
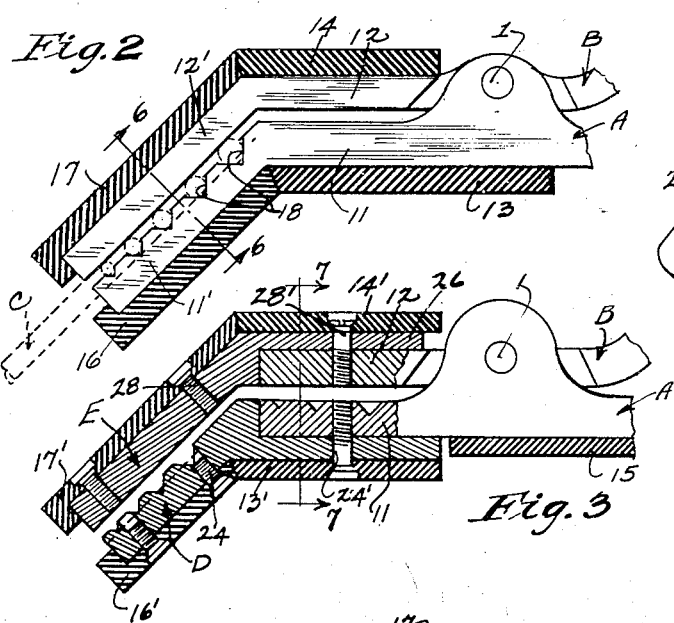
Fig. 2
Fig. 3
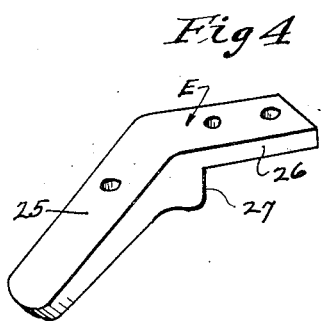
Fig. 4
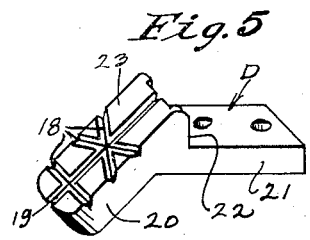
Fig. 5
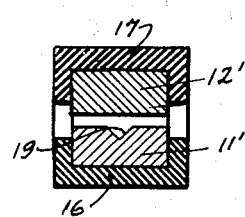
Fig. 6
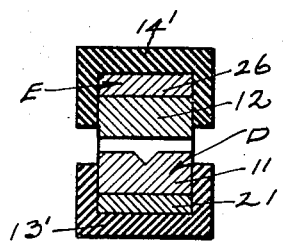
Fig. 7
INVENTOR.
JOSEPH U. GARIBAY.
BY Patented Mar. 4, 1947

2,416,872

UNITED STATES PATENT OFFICE 2,416,872

WELDING TOOL

Joseph U. Garibay, Montebello, Calif.

Application October 25, 1943, Serial No. 507,572

1 Claim. (Cl. 219—8)

This invention comprehends the provision of an improved type of welding tool or apparatus which may embody a conventional form of electrode holder reconstructed so as to include characteristics of my invention, or to which conventional tool my improvements may be added in the form of an attachment.

Conventional welding tools as now used extensively in industry include a pair of scissor-like members hinged together at a point intermediate the handles and jaws and tensioned so that the jaws are urged to closed positions for gripping and holding a section of welding rod which forms an electrode applicable to sheets of material or parts adapted to be welded together. The jaws are frequently disposed in parallelism outwardly of the hinge and are grooved longitudinally and transversely for providing seats for the welding rods or electrodes. Usually the electrode is disposed longitudinally of the jaws and when so held requires a tilting of the holding tool to correspond to the effective angle of the electrode which results in discomfort to the welder and occasions inaccuracy and inefficiency.

It is a primary object of my invention, therefore, to provide a welding tool possessing all of the conventional characteristics but additionally providing a more convenient and efficient form of the jaws and disposition of the welding rod for effecting welding operations of variable character.

Other objects will appear as the description of my improvements progresses.

I have shown a preferred form of my improvement in the accompanying drawing, together with certain modifications thereof, which while serving to illustrate the invention are not illustrative of other forms of the device contemplated hereby but are obviously subject to further modification, within the scope of the appended claims, without departing from the spirit of the invention.

In said drawing:

Fig. 1 is a side view of a conventional welding tool with my improved electrode holder applied thereto as an attachment;

Fig. 2 is a fragmentary longitudinal section of the tool body and jaws formed in accordance with my design and shown integral with the tool;

Fig. 3 is a section similar to Fig. 2 except that my improvements are shown as an attachment applied to the conventional jaws of the tool;

Figs. 4 and 5 are perspective views, respectively, of the upper and lower jaws detached from the conventional tool and which together form the attachment shown in Fig. 3;

Figs. 6 and 7 are, respectively, transverse sections of the device on lines 6—6 and 7—7 of Figs. 2 and 3.

Briefly described and referring particularly to Fig. 1, a conventional welding tool to which my improvements are adaptable includes: a pair of members A and B which are hinged together at 1 and are provided with handles 2 and 3, respectively, extended in a common direction from the hinge 1. Handle 2 has an electric socket 4 to which is applied a conductor 5, said socket and said conductor being covered by a telescoping member 6 of insulating material. Handle 3 has a protecting shield 7 of insulating material and of channeled cross section suitably attached thereto which extends as closely as possible to the hinge 1. Handles A and B are tensioned by means of a compression spring 8 confined in telescoping tubular members 9 and 10 each having a closed end (see Fig. 1), which members and end elements are also of insulating material, said spring serving to hold the handles spread apart while holding the usual jaws 11 and 12 in substantially parallel horizontal planes.

Jaws 11 and 12 are covered with channeled shields 13 and 14, respectively, and an intermediate shield 15 is attached to the lower side of member A. Thus, the metallic parts of the tool are completely or sufficiently covered by the insulating shields as to prevent accidental contact of the hands of an operator therewith.

The simplest form of my invention is shown in Figs. 2 and 6 in which the usually horizontal jaws 11 and 12 are formed with downwardly inclined extensions 11' and 12', respectively, having insulated shields 16 and 17, the upper ends of which abut the outer ends of shields 13 and 14 and the lower ends of which are formed so as to at least partially overlie the ends of the jaw extensions 11' and 12'.

It will be noted that the jaws 11 and 12 have transverse grooves 18, 18, etc., of the same or variable size and depth and longitudinal grooves 19, for selectively gripping and holding a welding electrode C during welding operations. When my improvements are applied to the tool, as shown in Fig. 2, said transverse and longitudinal grooves may be provided in the angularly disposed extension, or either of them, while the grooves in the horizontal portions are omitted.

As shown in Figs. 3, 4, 5, and 7, my improvements may be applied as an attachment to a conventional tool of the character shown in Fig. 1 by the provision of separable members D and E which are adapted to be applied, respectively, to the lower side of jaw 11 and to the upper side of the jaw 12 in the manner hereinafter described. Member D has a jaw 20 disposed at a suitable angle relative to a flat portion 21 and providing a shoulder 22 for engagement with the outer end of jaw 11. The upper face 23 of jaw 20 carries the same transverse and longitudinal grooves 18 and 19 as are conventional on the jaws 11 and 12, or otherwise. Jaw 20 carries a shield 16' while the attaching portion 21 thereof carries a shield 13'. Said shields are secured in position with the portions 20 and 21 as by means of screws 24 and 24', which are screwed in to the jaw 20 and the jaw 11, respectively, and have their heads depressed in counterbores in shields 16' and 13' so as to prevent contact of the screw heads with the hands of an operator.

Similarly, member E is applied to jaw 12 and has an inclined jaw 25, a flat attaching portion 26 and a shoulder 27 which is adapted to abut the outer end of jaw 12. Member E carries a shield 17' over the jaw 25 and a shield 14' over the portion 26 thereof. Screws 28 serve to hold shield 17' on jaw 25, and similar screws 28' hold the shield 14' and the member E on jaw 11.

Certain of the advantages of my invention will appear from the reading of the foregoing description. Other advantages arise from the provision of electric non-conducting means which insulate the metal spring 8 from possible contact by the operator at any point. Such means, as is well known, are also non-conductors of heat to a large degree, and thus serve to help prevent the spring 8 from becoming very hot from conduction or radiation of heat from the metal parts A and B, which would tend to weaken it and shorten its working life because it is often being cooled quickly. If heated to a considerable degree and then cooled quickly the metal of the spring will tend to crystallize in a well known manner. The non-conducting casing for the spring at all points not only reduces the degree of heating of the spring, but also slows down its rate of cooling, even in cold weather when the hot tool is laid aside quickly, as at quitting time.

What I claim is:

Jaw extension means for a welding tool which comprises a pair of pivoted elements each formed with a body portion and handle portion extending in one direction from the pivot of said elements, and a jaw extending in the opposite direction from said body, said jaws being disposed in said extension means in parallelism one above the other, including two electrode gripping members, one of said members having a rear extension for engaging against the bottom face of the lower jaw and a shoulder for engaging against the outer end of said lower jaw, the other of said members having a rear extension for engaging against the upper face of the upper jaw and a shoulder for engaging against the outer end of said upper jaw, each of said members having a downwardly inclined electrode gripping portion, the lower one of said portions being provided with a plurality of transverse notches of varying sizes in its work face, whereby a plurality of round rod electrodes of varying sizes may be selectively and securely gripped, one at a time, between said inclined portions, insulating shield means for encompassing approximately all of both of said inclined portions except their work faces and narrow areas of their sides adjacent their work faces, and means for fastening each of said inclined portions and its associated shield as a unit to the associated jaw of said tool.

JOSEPH U. GARIBAY.

REFERENCES CITED

The following references are of record in the file of this patent:

UNITED STATES PATENTS

| Number | Name | Date |
|---|---|---|
| 2,003,196 | Jackson | May 28, 1935 |
| 2,162,112 | Nickels | June 13, 1939 |
| 2,284,648 | Foreman | June 2, 1942 |
| 2,327,290 | Rice | Aug. 17, 1943 |
| 2,056,045 | Fauseh et al. | Sept. 19, 1936 |
| 2,213,306 | De Bene | Sept. 3, 1940 |
| 2,350,614 | Jackson | June 6, 1944 |

FOREIGN PATENTS

| Number | Country | Date |
|---|---|---|
| 404,601 | German | Oct. 20, 1924 |
| 208,218 | Swiss | Apr. 1, 1940 |